(12) United States Patent
Ogale

(10) Patent No.: US 9,047,706 B1
(45) Date of Patent: Jun. 2, 2015

(54) ALIGNING DIGITAL 3D MODELS USING SYNTHETIC IMAGES

(71) Applicant: Google Inc., Mountain View, CA (US)

(72) Inventor: Abhijit Ogale, Mountain View, CA (US)

(73) Assignee: Google Inc., Mountain View, CA (US)

( * ) Notice: Subject to any disclaimer, the term of this patent is extended or adjusted under 35 U.S.C. 154(b) by 219 days.

(21) Appl. No.: 13/801,810

(22) Filed: Mar. 13, 2013

(51) Int. Cl.
*G06T 15/00* (2011.01)
*G06T 19/20* (2011.01)
*G06T 7/00* (2006.01)

(52) U.S. Cl.
CPC .............. *G06T 19/20* (2013.01); *G06T 7/0071* (2013.01)

(58) Field of Classification Search
CPC ...... G06T 7/0071; G06T 7/0042; G06T 19/20
USPC ......................................... 345/420
See application file for complete search history.

(56) References Cited

U.S. PATENT DOCUMENTS

| 7,352,386 B1 * | 4/2008 | Shum et al. ............. 348/42 |
| 2004/0051783 A1 * | 3/2004 | Chellappa et al. ............. 348/46 |

OTHER PUBLICATIONS

Aliaga et al., "A Self-Calibrating Method for Photogeometric Acquisition of 3D Objects," IEEE, 2010.*
Lindstrom et al., "Image-Driven Simplification," ACM, 2000.*
Aitchison, "Synthetic Images of Faces using a Generic Head Model," Doctor of Philosophy Thesis (1991).
Chaouch et al., "A Novel Method for Alignment of 3D Models," Institut National de Recherche en Informatique et en Automatique (2008).
Choudhary, "Improving the Efficiency of SfM and its Applications," Master of Science Thesis (2012).
Horn et al., "Using Synthetic Images to Register Real Images with Surface Models," *Communications of the ACM,* 21(11):914-924 (1978).
Horn et al., "Using Synthetic Images to Register Real Images with Surface Models," Massachusetts Institute of Technology Artificial Intelligence Laboratory, (1977).
Häming et al., "The Structure-From-Motion Reconstruction Pipeline—A Survey with Focus on Short Image Sequences,"*Kybernetika,* 46(5):926-937 (2010).
Jebara et al., "3D Structure from 2D Motion," MIT Media Laboratory (1999). Retrieved from the Internet on Mar. 29, 2013: URL:http://pubs.media.mit.edu/pubs/papers/sfm.pdf.
Re et al., "Evaluation of Area-Based Image Matching Applied to DTM Generation with Hirise Images," *Remote Sensing and Spatial Information Science,* 1-4:209-214 (2012).

* cited by examiner

*Primary Examiner* — Kee M Tung
*Assistant Examiner* — Nicholas R Wilson
(74) *Attorney, Agent, or Firm* — Lerner, David, Littenberg, Krumholz & Mentlik, LLP

(57) ABSTRACT

To align a first digital 3D model of a scene with a second digital 3D model of the scene, real-world photographs of the scene are received and synthetic photographs of the first digital 3D model are generated according to different camera poses of a virtual camera. Using the real-world photographs and the synthetic photographs as input photographs, points in a coordinate system of the second digital 3D model are generated. Camera poses of the input photographs in the coordinate system of the second 3D model also are determined. Alignment data for aligning the first 3D model with the second 3D model is generated using the camera poses of the virtual camera and the camera poses corresponding to the input photographs.

20 Claims, 8 Drawing Sheets

ALIGNING DIGITAL 3D MODELS USING SYNTHETIC IMAGES

FIELD OF THE DISCLOSURE

The present disclosure relates to generating and positioning digital three-dimensional models of physical structures.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Various software applications allow users to manually develop digital 3D models of various real-world objects. In general, users utilize various 3D shapes (such as cubes, spheres, and cones) to directly define 3D geometry or 2D shapes (such as circles, rectangles, and triangles) to define facets of the 3D geometry. Some software applications also permit users to texture 3D geometry using photographs or artificial patterns. Today, many users develop highly detailed models of landmark structures and apply real-world photographs of these landmark structures to the models as textures.

Meanwhile, digital imaging techniques have been developed to extract 3D geometry of a real-world object from sets of photographs of the object. According to one such technique, a system identifies a common feature depicted in multiple photographs captured from different positions and different camera orientations. The system then uses the common identified feature to derive points in the feature geometry as well as camera poses in a 3D coordinate system. In this manner, the system generates a "3D point cloud," which also can be textured, to define an automatically extracted 3D model of the object.

A manually developed 3D model may describe a portion of the 3D geometry missing from an automatically extracted 3D model of the same real-world object, and the automatically extracted 3D model may describe some of the 3D geometry of the real-world object at a higher resolution that the manually developed 3D model. However, digital 3D models developed using these two different techniques exist in different coordinate systems and conform to different formats.

SUMMARY

One embodiment of the techniques discussed below is a method performed on one or more processors for aligning a first digital 3D model of a scene with a second digital 3D model of the scene. The method includes receiving real-world photographs of the scene and generating synthetic photographs of the first digital 3D model according to different camera poses of a virtual camera. The method also includes using the real-world photographs and the synthetic photographs as input photographs. Further, the method includes generating points in a coordinate system of the second digital 3D model to define portions of geometry of the second 3D model, as well as generating camera poses of the input photographs in the coordinate system of the second 3D model, using the input photographs. Still further, the method includes generating alignment data for aligning the first 3D model with the second 3D model using the camera poses of the virtual camera and the camera poses corresponding to the input photographs.

Another embodiment of the techniques of the present disclosure is a computer-readable medium that stores instructions. When executed on one or more processors, the instructions cause the one or more processors to receive real-world photographs of a scene, receive digital model data that specifies geometry of a first digital 3D model of the scene in a first coordinate system, and generate synthetic photographs of the first digital 3D model using the received digital model data. Each of the synthetic photographs is a static image generated according to a different position and orientation of a first virtual camera in the first coordinate system. The instructions further cause the one or more processors to apply 3D geometry reconstruction to the real-world photographs and the synthetic photographs to determine 3D geometry of a second 3D model of the scene defined in a second coordinate system as well as positions and orientations of a second virtual camera in the second coordinate system for the real-world photographs and the synthetic photographs. The instructions also cause the one or more processors to automatically align the first digital 3D model with the second digital 3D model using the synthetic photographs.

Yet another embodiment of the techniques of the present disclosure is a computer-implemented method for combining features of digital 3D models. The method includes receiving a first digital 3D model of a scene, receiving a second digital 3D model of the scene, and automatically aligning the first digital 3D model with the second digital 3D model. The aligning includes applying 3D geometry reconstruction to first images associated with the first digital 3D model and second images associated with the second digital 3D model. The method also includes applying features of one of the first digital 3D model and the second digital 3D model to the other one of the first digital 3D model and the second digital 3D model.

DETAILED DESCRIPTION

Figure 1:
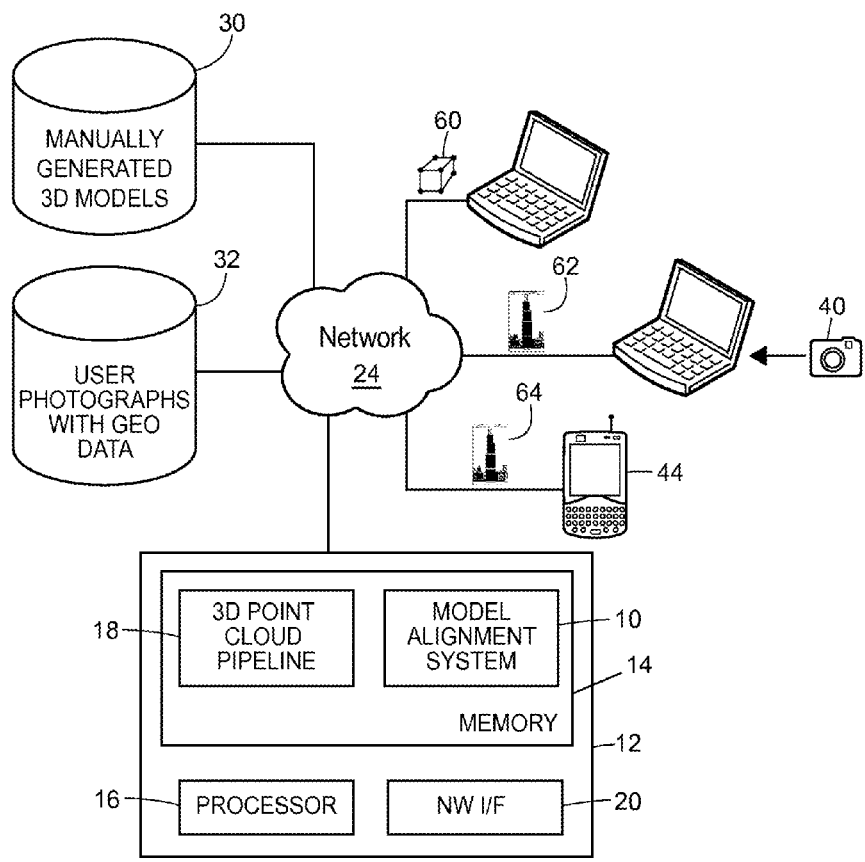
FIG. 1 is a block diagram of an example computing environment in which a model alignment system automatically aligns a manually developed digital 3D model of an object with a digital 3D model of the object automatically extracted from a set of photographs.

A model alignment system of the present disclosure aligns (or "registers") a manually developed digital 3D model of a scene, which can be made up of one or several objects, with a digital 3D model of the same scene automatically extracted from photographs (referred to below as an "automatically generated model"). To this end, the model alignment system receives photographs of the scene having different poses, i.e., location and orientation of the camera relative to the scene. The model alignment system also generates "synthetic photographs" of the modeled scene according to different poses of a virtual camera. In other words, the model alignment system generates static images of the manually developed model as if the scene were photographed from different perspectives in the virtual world of the model. The model alignment system then applies a 3D geometry reconstruction technique to both the real-world photographs and the synthetic photographs to generate a 3D point cloud which at least partially defines the geometry of the automatically generated model. As part of this process, the model alignment system also determines camera poses corresponding to the input photographs in the coordinate system of the 3D point cloud. In this manner, the model alignment system determines how camera poses in the coordinate system of the manually developed digital model translate to the coordinate system of the automatically generated model, thereby allowing the two models to be aligned.

Once aligned, the features of the 3D models can be combined. In other words, one or both models can be used to supplement the other model. For example, the manually developed model now can be accurately textured using the real-world photographs used to generate the 3D point cloud. Moreover, because automatic extraction of the 3D point cloud from photographs generally yields 3D geometry of higher resolution, portions of the manually developed model can be refined using the automatically generated model while maintaining the completeness of the manually developed model. On the other hand, because real-world photographs sometimes "favor" certain perspectives of a landmark, an automatically generated model may have gaps in geometry which the manually developed model can fill. As yet another example, the manually developed model can be used to create depth maps of the real-world photographs or, when the real-world photographs are arranged as a 3D tour of a scene, the manually developed digital 3D model can be used to generate smooth transitions between photographs.

Systems and method for 3D model alignment and the related techniques are discussed in more detail with reference to FIGS. 1-9. For simplicity, the examples below continue to refer to manually developed 3D models. However, it is noted that a model alignment system also can generate synthetic photographs of other types of models, including automatically generated models, and use these synthetic photographs as part of the input in generating 3D point clouds. As a more specific example, the model alignment system can apply these techniques to two automatically generated models by generating synthetic photographs of one (or both) of these models. In general, the techniques of the present disclosure can be used with digital 3D models regardless of how these models were generated.

Referring to FIG. 1, an example model alignment system 10 is implemented in a server 12 as a software instructions stored in a memory 14 and executable on a processor 16. The memory 14 also stores instructions that implement a 3D point cloud pipeline 18 for extracting 3D geometry from photographs to generate a 3D point cloud and determine camera poses corresponding to the photographs. In this example, the software components 10 and 18 are separate, but in other implementations these components can operate in a single software application or module.

The server 12 includes a network interface module 20 coupled to the communication network 24 (e.g., the Internet) via which the model alignment system 10 can access a database 30 that stores manually developed digital 3D models of various scenes, as well as a database 32 that stores user photographs. The databases 30 and 32 can operate in a same network or different networks, and can be maintained by a same provider or different providers, depending on implementation. Manually developed digital 3D models and photographs stored in these databases can come from any number of sources. For example, a certain user can take several photographs of a landmark structure using a camera 40 and upload these photographs to the database 32 using a computer 42, another user can capture and upload photographs of the same landmark structure using a smartphone 44, and yet another user can manually develop a digital 3D model of the landmark structure using a computer 50 and upload the model to the database 30. As a result, photographs of a same scene typically do not have the same camera pose.

More generally, the database 32 in various implementations can store photographs that come from any suitable manual or automated sources, such as cameras mounted on vehicles to generate street-level imagery, cameras mounted on aircraft, stills from video feeds, etc. Thus, for a certain scene, the database 32 can store photographs captured manually or automatically from different locations with different camera orientations, and using different equipment.

The database 32 also can store metadata for the photographs. For example, metadata of a photograph captured with a camera equipped with a positioning device can include a set of Global Positioning Service (GPS) coordinates. Metadata of another photograph can include user-specified text such as "Eiffel Tower" or "Big Ben." More generally, the metadata can include any suitable direct or indirect indication of location.

The user operating the computer 50 can use such 3D modeling software as, for example, AutoCAD®, Autodesk® Maya, Sketchup®, K-3D, etc. Depending on the software, the user can define the geometry of a 3D model using 3D solids such as cubes, spheres, cylinders, cones, etc. and/or 2D shapes to describes facets of 3D objects, for example. The user then may apply colors and/or textures, such as photographic textures, to the 3D geometry to create a highly realistic, interactive (e.g., rotatable, scalable) model. Depending on the implementation, this model can be stored as digital model data in a computer-readable memory in a format specific to the software used to develop the model or, alternatively, a standard format recognizable by various software applications. The model alignment system 10 may include a software component capable of interpreting this digital model data and at least rendering a manually developed 3D model.

According to an example scenario, a user operates the Sketchup software executing on the computer 50 to develop a digital 3D model 60 of the Willis Tower in Chicago, Ill. The user then submits the model 60 to the database 30 via the network 24 in the form of one or several data files and accompanies the submission with the text "Willis Tower, Chicago, Ill." The model alignment system 10 retrieves the model 60 from the database 30 and generates synthetic photographs of the model 60. To this end, the model alignment system 10 may invoke the Sketchup software to interpret the data and generate synthetic photographs of the model 60 from different perspectives. More specifically, the model alignment system 10 may rotate the model relative to the virtual camera along one or several axis, zoom in on the portions of the model 60, etc.

Various users also submit numerous (e.g., tens of thousands) photographs of the Willis Tower, including photographs 62 and 64, to the database 32. In one implementation, user-submitted photographs are formatted so as to conform to a standard recognized by the model alignment system 10. The model alignment system 10 similarly retrieves some or all of the photographs of the Willis Tower from the database 32. According to one implementation, the model alignment system 10 generates a query that specifies selection criteria for picking out a subset of the available photographs of the Willis Tower. The query may include a geospatial search string which can be used to search through the available photographs (e.g., "Willis Tower," "Sears Tower" (former name of the landmark), etc.). The query also may specify a radius R (e.g., 0.5 ml) to indicate that all photographs within the distance R of the Willis Tower should be retrieved.

The model alignment system 10 then supplies the synthetic photographs of the model 60 and the real-world photographs 62 and 64 (along with other photographs of the Willis Tower) to the 3D point cloud pipeline 18 that performs 3D geometry reconstruction using a structure-from-motion (SFM) technique with bundle adjustment, for example. In a typical case, the number of real-world photographs the 3D point cloud pipeline 18 receives far exceeds the number of synthetic photographs. In other words, it is sufficient to introduce a very small number of synthetic photographs to the 3D point cloud pipeline 18 to align the manually developed model 60 with the model automatically generated from the photographs 62, 64, etc. It is also noted that the small number of synthetic photographs does not substantially affect the generation of a 3D point cloud. Thus, a 3D point cloud generated using N real-world photographs and M synthetic photographs, where N>>M, can be considered to be equivalent to a 3D point cloud generated using N real-world photographs only.

Figure 2:
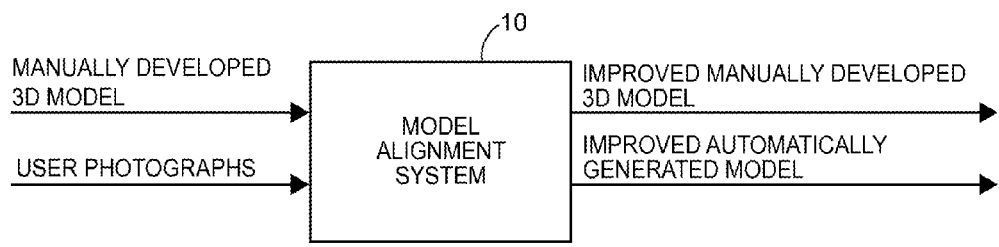
FIG. 2 is a block diagram that schematically illustrates inputs and outputs of an example model alignment system that can operate in the computing environment of FIG. 1.

After the 3D point cloud pipeline 18 generates a 3D point cloud and determines camera poses for the received real and synthetic photographs, the model alignment system 10 determines how the model based on the 3D point cloud and the manually developed model are aligned (suitable techniques for generating a 3D point cloud are discussed in more detail with reference to FIG. 3). Thus, as schematically illustrated in FIG. 2, the model alignment system 10 can use a manually developed model and synthetic photographs as inputs and output an improved manually developed model, an improved automatically generated model, or both.

Additionally or alternatively, the model alignment system 10 can generate alignment information in the form of a transform function (e.g., a matrix or a set of matrices) for use by various applications. The model alignment system 10 in some of these cases operates as a web service that responds to user requests that conform to a certain format. As one example, a user may wish to upload a manually developed 3D model to the model alignment system 10 to receive alignment functions for certain photographs. The user then can use the alignment functions to apply some or all of the photographs to the manually developed model using a personal computer, in a cloud, etc. In an analogous manner, another user may upload a series of photographs of a landmark to the model alignment system 10 and receive alignment functions for various manually developed 3D models of the landmarks. In this manner, the user can use a software similar to the 3D point cloud pipeline 18 to automatically generate a 3D model and apply one manually developed 3D model to one portion of the automatically generated model, another manually developed 3D model to another portion of the automatically generated model, etc.

Further, although the example model alignment system 10 in FIG. 1 is implemented in a single server device, similar model alignment systems can be implemented on groups of servers in a distributed manner, for example. Moreover, a model alignment system can be implemented on a personal computer or other another electronic device having sufficient computational capability and memory.

Figure 3:
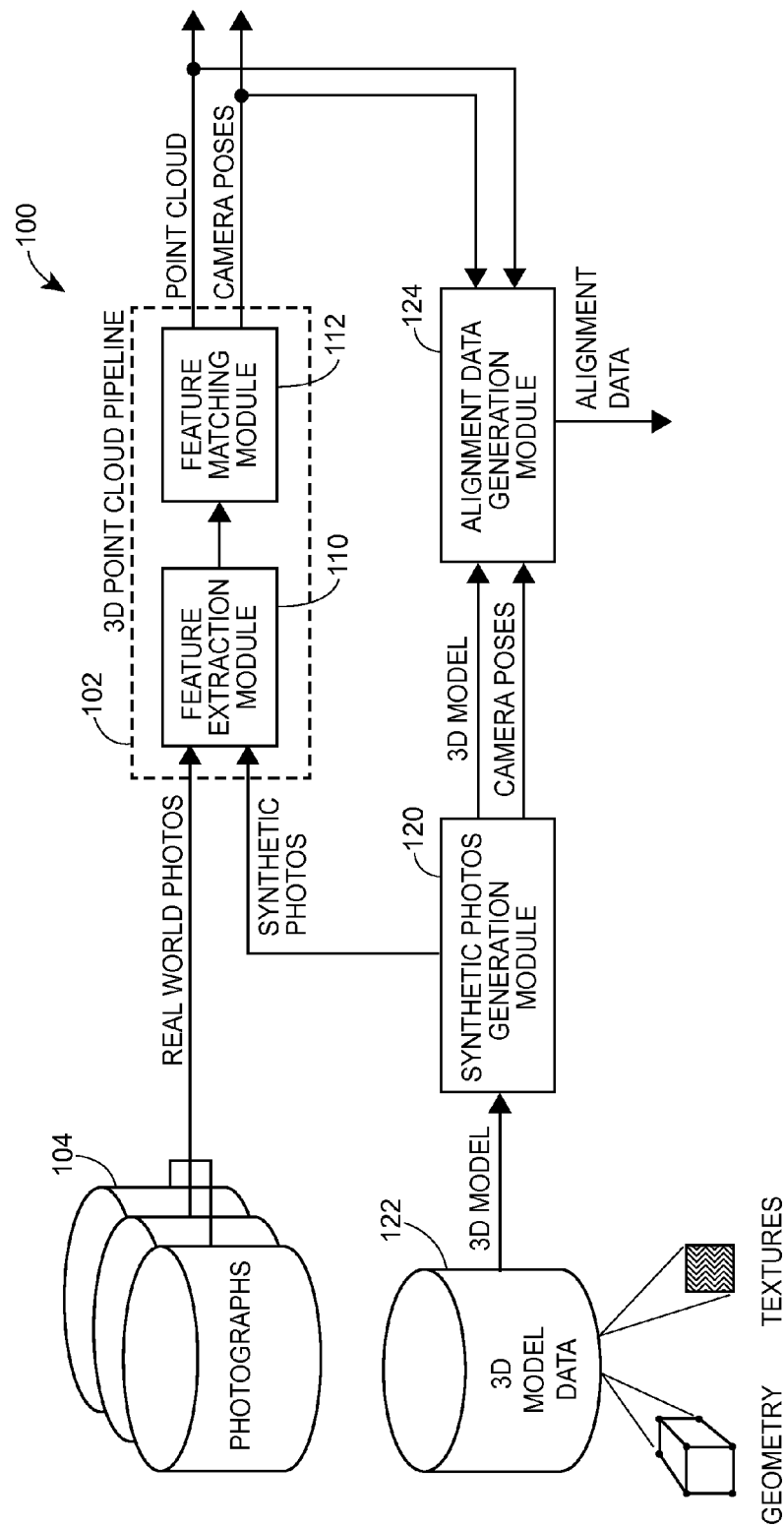
FIG. 3 is a block diagram of an example system for generating and aligning 3D models that can be implemented in the computing environment of FIG. 1.

Next, FIG. 3 illustrates an example system 100 that (i) generates a 3D point cloud to define the geometry of an automatically generated digital 3D model and (ii) automatically generates alignment data for this model and a manually developed 3D mode of the same scene. The system 100 includes a 3D point cloud pipeline 102 that includes a feature extraction module 110 and a feature matching module 112 configured to identify features in photographs received from a photograph database 104 and match the features across the photographs, respectively. The components 110 and 112 can be implemented using software instructions, for example. Generally speaking, the feature extraction module 110 implements pattern recognition techniques to identify common features in multiple photographs, i.e., features that depict the same thing in the physical world. The feature matching module 112 then matches these features across photographs and determines coordinates of these features in a 3D space as well as camera poses of the photographs in the 3D space. To this end, the feature matching module 112 can utilize any suitable techniques, including those known in the art (such as SFM with bundle adjustment). Further, in some implementations, the 3D point cloud pipeline 102 can include additional components, such as a module (not shown) configured to remove from the input those photographs that are cropped, are too small, have an excessively large field of view, etc.

Figure 4:
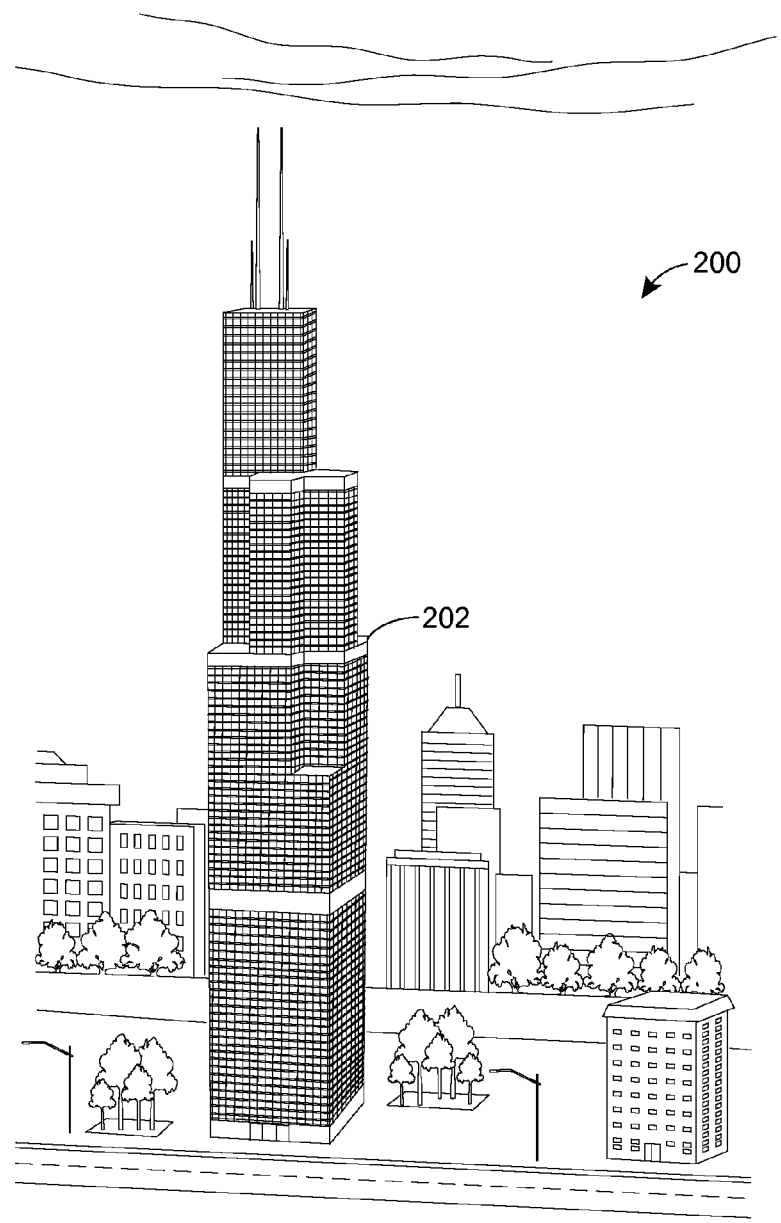
FIG. 4 illustrates an example landmark structure and user photographs of the landmark structure.
Figure 4:
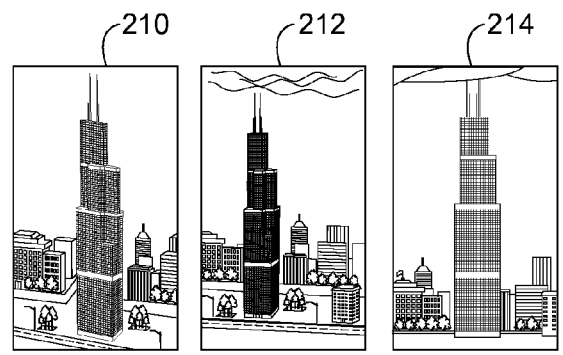

As a more specific example, the 3D point cloud pipeline 102 can receive photographs of a landmark building 202 that exists in the real world 200, as illustrated in FIG. 4. Because tourists often photograph the landmark building 202 (Willis Tower in Chicago, Ill.), the photograph database 104 may store numerous suitable photographs including example photographs 210, 212, and 214. The photographs 210-214 were captured from different locations in the city and with different camera orientations. However, these photographs depict several common features which the feature extraction module 110 can recognize, and from which the feature matching module 112 can generate points in a 3D point cloud.

Referring back to FIG. 3, a model alignment system can include a synthetic photograph generation module 120 and an alignment data generation module 124. The synthetic photograph generation module 120 receives a manually developed model from a database 122. For example, the synthetic photograph generation module 120 can receive model geometry and texture data to be applied to the model geometry. The synthetic photograph generation module 120 then generates synthetic photographs of the manually developed model and provides these synthetic photographs as additional input to the 3D pipeline 102.

In one implementation, the synthetic photograph generation module 120 generates synthetic photographs by emulating a person walking around the scene in the virtual world of the manually generated model and taking eye-level photographs (a "virtual photographer"). Further, the synthetic photograph generation module 120 can position the virtual photographer at different locations relative to the model in view of the locations of the real-world photographs. Thus, if tourists tend to favor certain locations in the city when taking pictures of a landmark, the synthetic photograph generation module 120 can position the virtual photographer approximately at the same locations in the virtual world.

Figure 5:
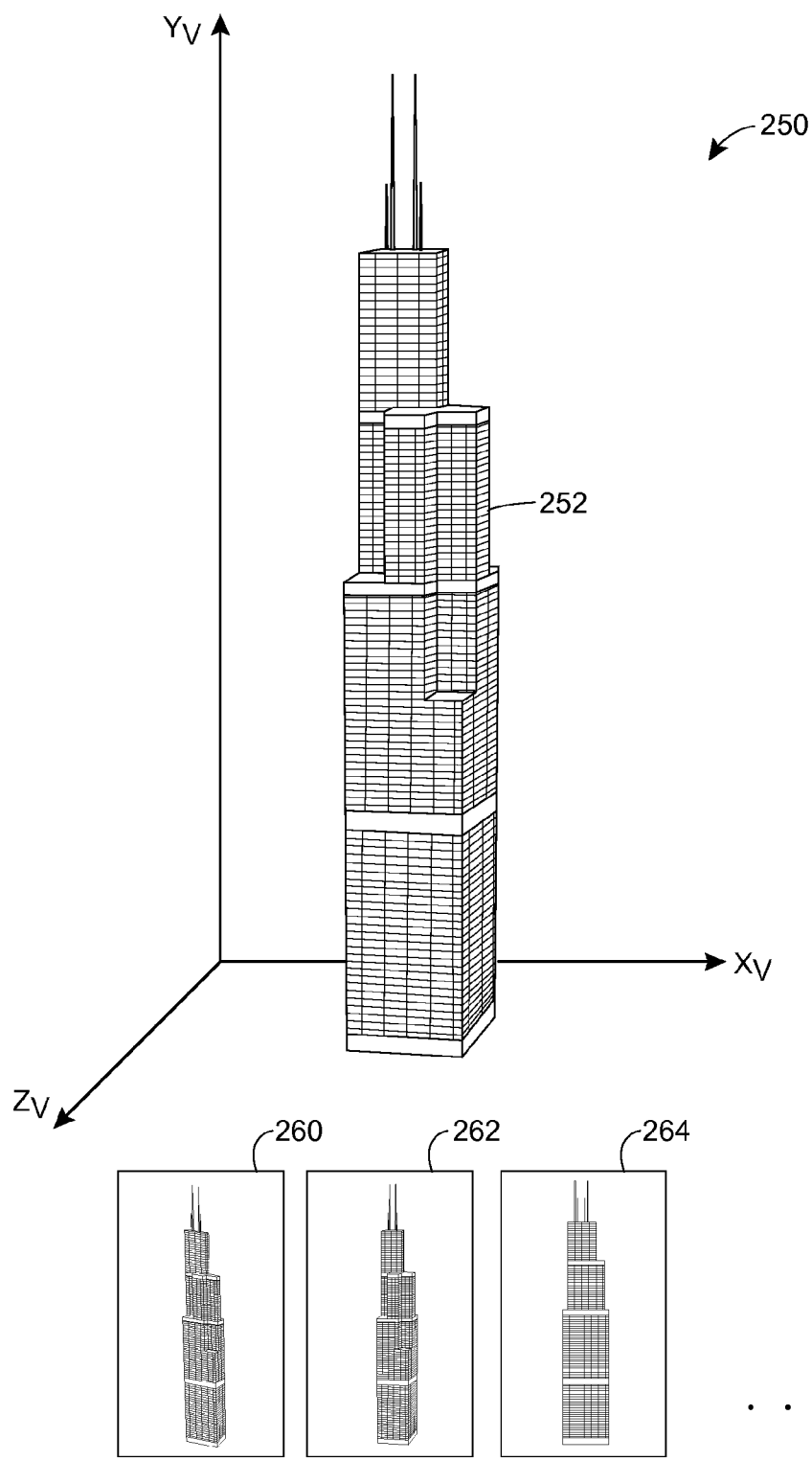
FIG. 5 illustrates one example of a manually developed digital 3D model of the landmark structure depicted in FIG. 4 and synthetic images of the manually developed digital 3D model.

Continuing with the example introduced above, the synthetic photograph generation module 120 can receive a manually developed model 252 that exists in a 3D coordinate system 250, as illustrated in FIG. 5. The synthetic photograph generation module 120 can generate synthetic photographs 260, 262, 264, etc. More specifically, the synthetic photograph generation module 120 can position a virtual camera at various points in the 3D coordinate system 250, orient the virtual camera toward the model 252, and generate static images.

As the synthetic photograph generation module 120 generates synthetic photographs, the module 120 provides camera poses corresponding to these synthetic photographs to the alignment data generation module 124. In the example discussed above, the camera poses include position (x, y, z) and orientation $(q_0, q_1, q_2, q_3)$ in the 3D coordinate system 250. The alignment data generation module 124 also receives the manually developed model (e.g., the model 202) as well as the 3D point cloud along with the corresponding camera poses from the 3D point cloud pipeline 102. Based on these inputs, the module 124 generates alignment data for an automatically generated model corresponding to the 3D point cloud and the manually developed model. The alignment data can include translation parameters, rotation parameters, and scale parameters. Accordingly, an alignment function based on the alignment data can translate, rotate, and scale the desired digital 3D model.

Figure 6:
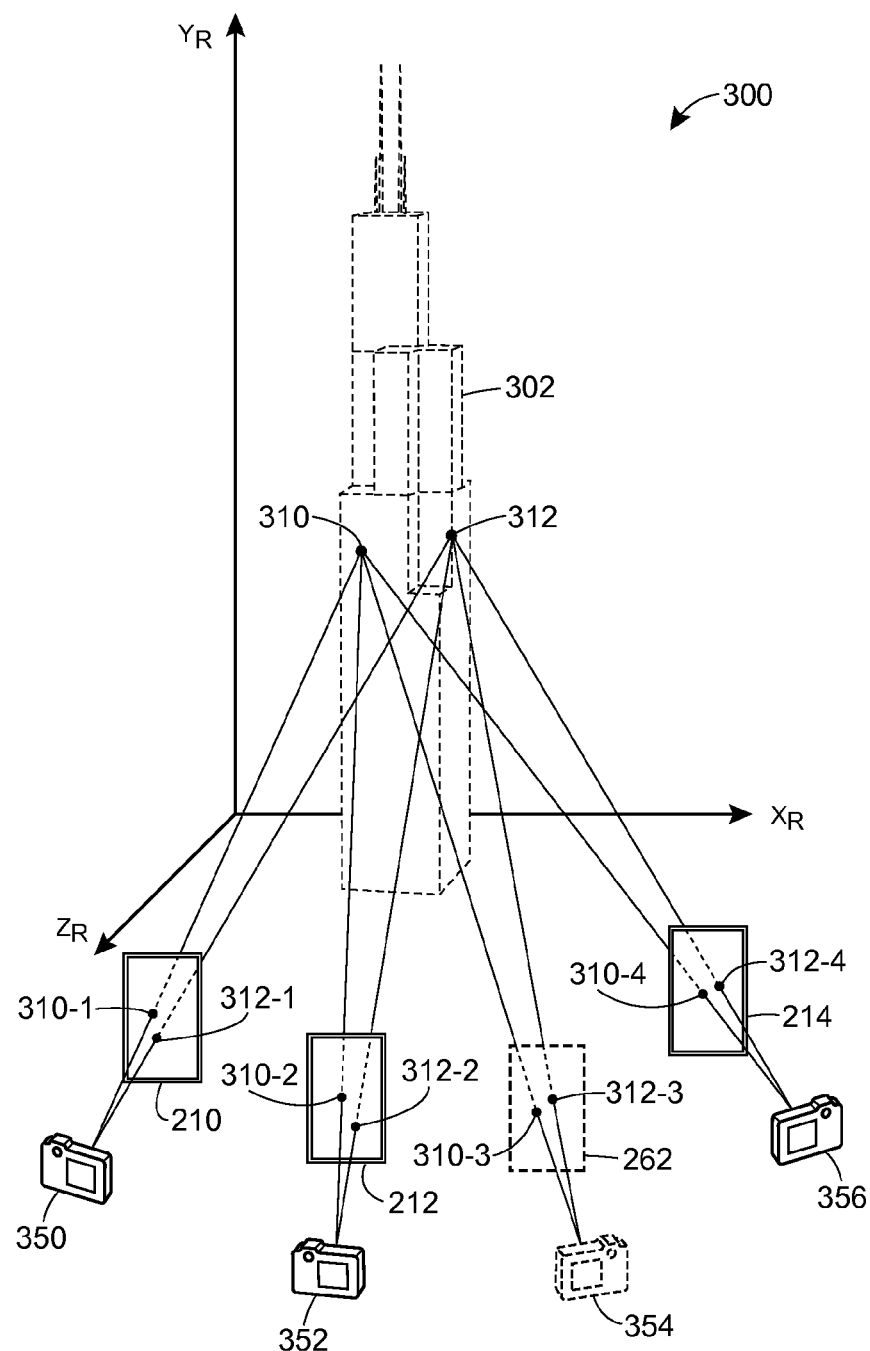
FIG. 6 illustrates extraction of points from the example user photographs of FIG. 4 and the synthetic images of FIG. 5.

To further illustrate how alignment data generation module 124 generates alignment data in the system 100, FIG. 6 illustrates a digital 3D model 302 being automatically developed using the photographs 210, 212, and 214 while being aligned with the manually developed model 252 using the synthetic photograph 262.

The automatically generated model 302 is disposed in a 3D coordinate system 300. The feature extraction module 110 in an example scenario recognizes the point 310-1 in the real-world photograph 210 as part of a certain feature of the (real-world) Willis Tower. The feature matching module 112 then locates points the corresponding points 310-2, 310-3, and 310-4 in the photographs 212, 262, and 214, respectively. Using a pinhole camera model, the 3D point cloud pipeline 102 then determines the coordinates of a reconstructed point 310 in the coordinate system 300, where the points 310-1, 310-2, 310-3, and 310-4 are projections of the point 300 onto the 2D photographs 210, 212, 262, and 214, respectively. Similarly, the 3D point cloud pipeline 102 determines the coordinates of a reconstructed point 312, where the points 312-1, 312-2, 312-3, and 312-4 are projections of the point 300 onto the 2D photographs 210, 212, 262, and 214, respectively.

In some scenarios, the point 310-3 in the synthetic photograph 262 is part of the geometry of the manually developed model 250. For example, the point 310-3 can be a corner of a modeled building. In other scenarios, the point 310-3 is part of the texture of the manually developed model 250.

The 3D point cloud pipeline 102 also determines camera poses of a real-world camera 350 used to capture the real-world photograph 210, a real-world camera 352 used to capture the real-world photograph 212, a real-world camera 354 used to capture the synthetic photograph 262, and a real-world camera 256 used to capture the real-world photograph 214. For example, for each of the cameras 350-356, the 3D point cloud pipeline 102 can determine a pose defined by position and orientation in the coordinate system 300. In a typical scenario, the 3D point cloud pipeline 102 determines a large number of points in the 3D point cloud of the automatically generated model 302 using a large number of real-world photographs and a relatively small number of synthetic photographs.

Thus, the 3D point cloud pipeline 102 determines camera poses to both real-world and synthetic photographs in the same coordinate system 300. However, as discussed above, the synthetic photograph generation module 120 also provides to the alignment data generation module 124 positions and orientations of the synthetic photographs in the 3D coordinate system 250. The system 100 therefore determines camera poses of synthetic photographs both in the coordinate system 250 and the coordinate system 300.

Figure 7:
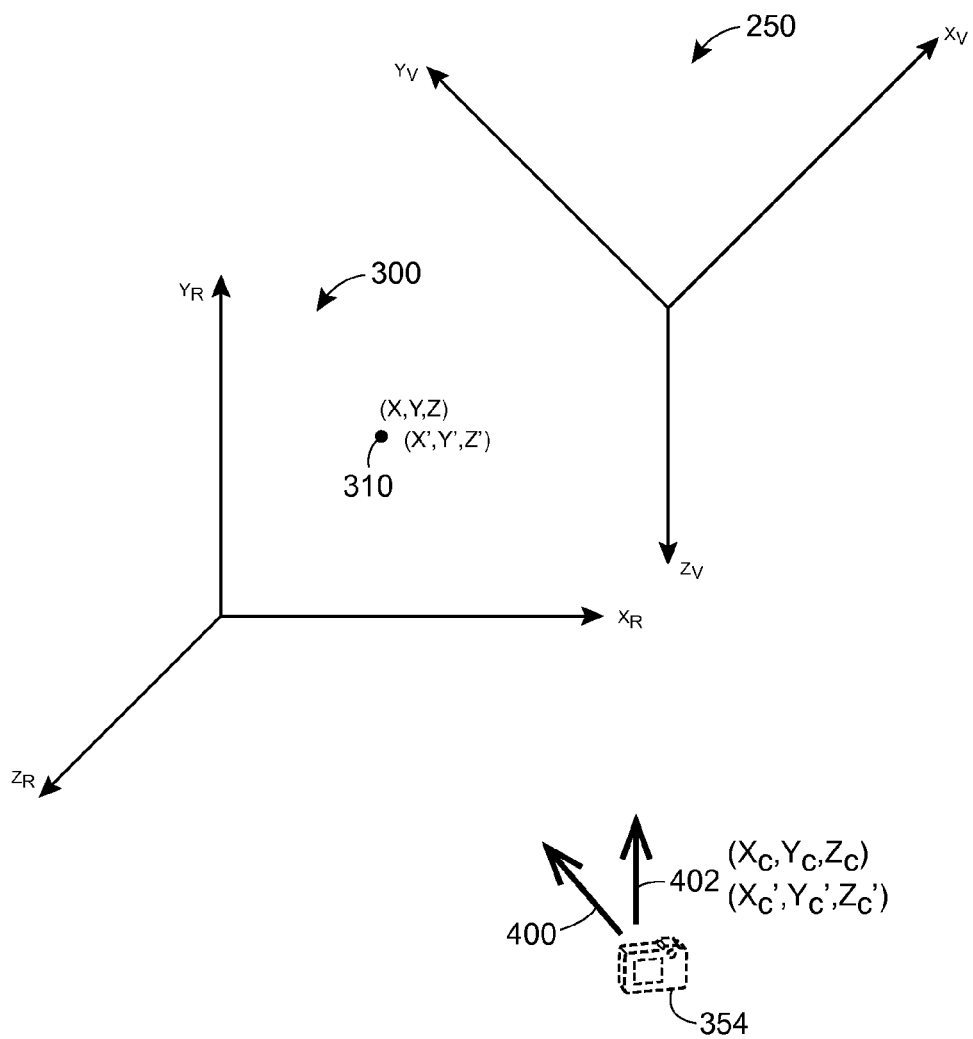
FIG. 7 schematically illustrates locating points and camera poses common to the respective coordinate systems of a manually developed digital 3D model and an automatically extracted digital 3D model.

For example, as illustrated in FIG. 7, position $(x_c, y_c, z_c)$ of the virtual camera 354 in the coordinate system 250 and orientation indicated by arrow 400 corresponds to position $(x'_c, y'_c, z'_c)$ of the virtual camera 354 in the coordinate system 300 and orientation indicated by arrow 402. Using several camera poses of synthetic photographs, the alignment data generation module 124 can generate a transform function in the form of a matrix for example, using which a manually generated digital 3D model can be transposed from the coordinate system 250 to the coordinate system 300 of an automatically generated digital 3D model.

Figure 8:
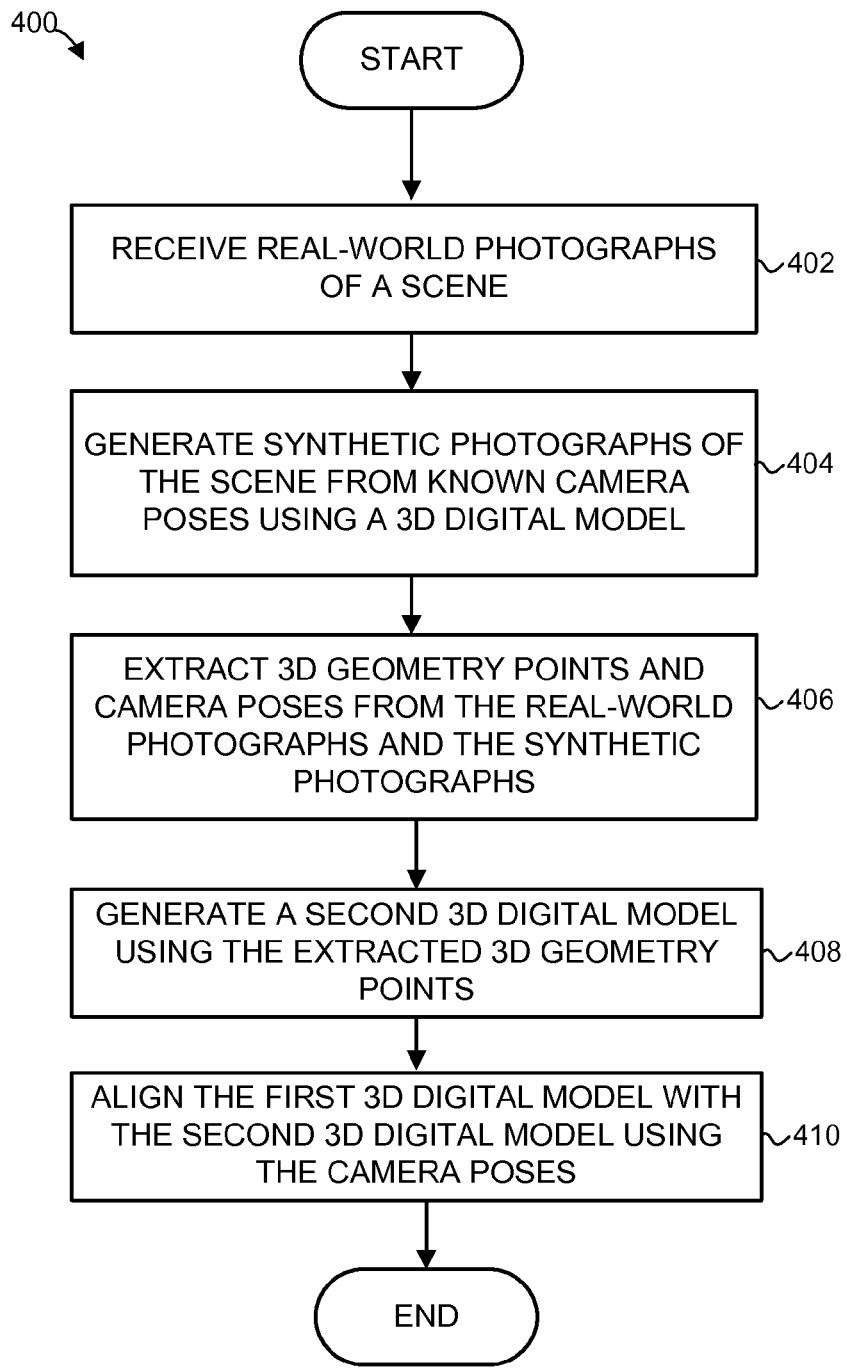
FIG. 8 is a flow diagram of an example method for aligning 3D models developed using different techniques, which can be implemented in the model alignment system of FIG. 2.

Next, an example method 400 for aligning 3D models of different types is discussed with reference to FIG. 8. The method 400 can be implemented as a set of computer-executable instructions and stored in a computer-readable memory. For example, the method 400 can be implemented in the model alignment system 10 of FIGS. 1 and 2 or the system 100 of FIG. 3. In general, the method 400 can be implemented in a network server, a client device, or in any suitable computing device or a group of computing devices.

The method 400 begins at block 402, where real-world photographs of a scene are received. As discussed above, the sources of real-world photographs can be manual or automatic. Next, at block 404, synthetic photographs of the same scene are generated using another digital model, which can be a manually generated digital 3D model or a 3D model generated using some other technique. Camera poses of the synthetic photographs in the coordinate system of the other digital model are recorded for subsequent use in alignment determination at block 410.

At block 406, 3D geometry (e.g., a 3D point cloud) is extracted from the real-world photographs and the synthetic photographs at block 406 using an SFM technique, for example, and a 3D model is automatically generated using the 3D point cloud at block 408. For example, the 3D point cloud can be organized into a 3D mesh. If desired, the geometry also can be textured using photographs or another suitable type of imagery.

At block 410, the two digital 3D models are aligned using (i) the camera poses in the coordinate system of the 3D point cloud (and, accordingly, the automatically generated digital 3D model) determined as part of the process of extracting 3D geometry at block 406 as well as (ii) camera poses of the synthetic photographs in the coordinate system of the other digital model. The method completes after block 410.

Figure 9:
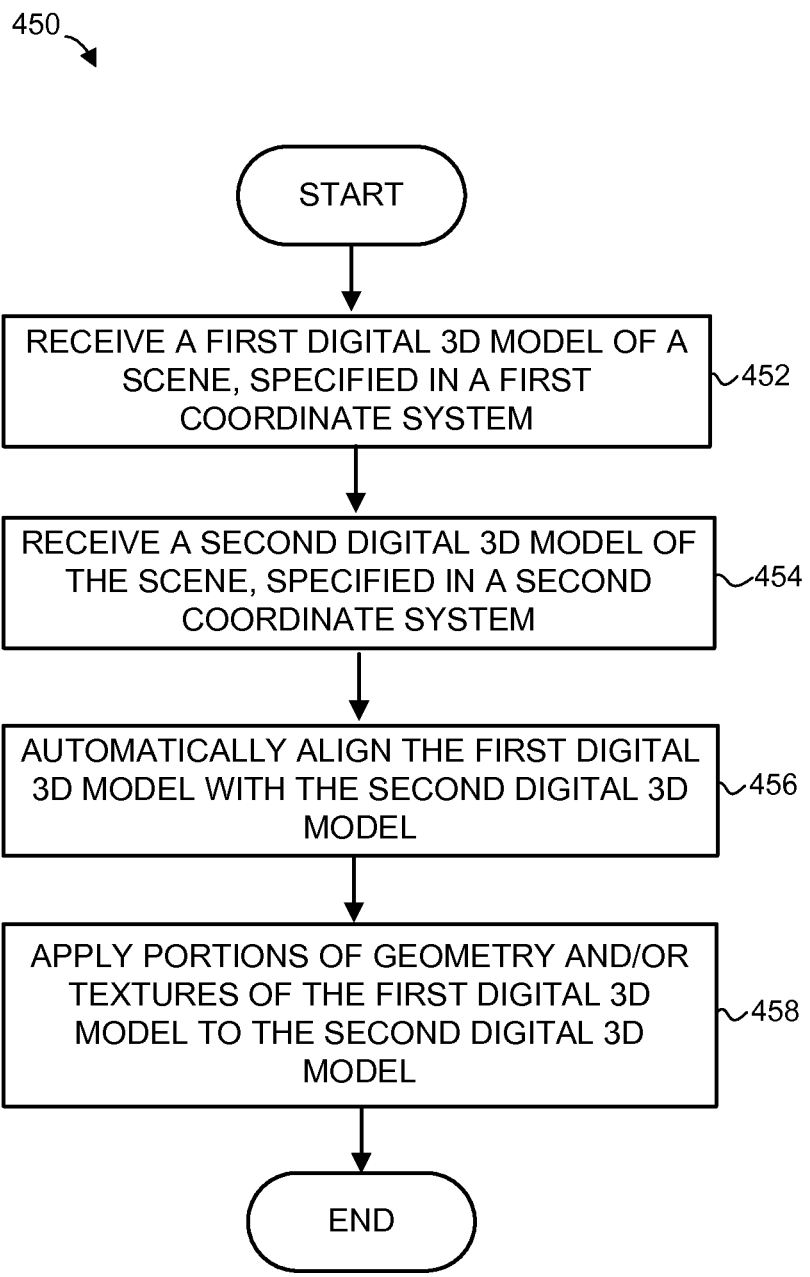
FIG. 9 is a flow diagram of an example method for improving geometry and/or textures of a digital 3D model of a scene using another digital 3D model of the scene, which can be implemented in the computing environment of FIG. 1.

Now referring to FIG. 9, an example method 450 for improving geometry and/or textures of a digital 3D model of a scene using another digital 3D model of the scene can be implemented in the computing environment of FIG. 1. At block 452, a first digital 3D model of a scene is received. A second digital 3D model of the same scene is received at block 454. The two models are specified in two different coordinate systems.

At block 456, the two models are automatically aligned. For example, when the first model is based on real-world photographs, synthetic photographs of the second model are generated and input into a 3D point cloud pipeline that extracts the geometry of the first model from photographs. As another example, synthetic photographs of both models can be generated and input to a 3D point cloud pipeline to generates a common model and camera poses in the same coordinate system.

Once the two models are aligned, portions of the geometry and/or some of the textures of the first model can be applied to the second model at block 458. In some cases, portions of the geometry and/or some of the textures of the second model also are applied to the first model. In other words, the models can be used for mutual benefit when the alignment data is available. The method completes at block 458.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for aligning digital 3D models through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method performed on one or more processors for aligning a first digital 3D model of a scene with a second digital 3D model of the scene, the method comprising:
   receiving, by the one or more processors, real-world photographs of the scene;
   generating, by the one or more processors, synthetic photographs of the first digital 3D model according to different camera poses of a virtual camera;
   using input photographs that include the real-world photographs and the synthetic photographs, generating, by the one or more processors, (i) points in a coordinate system of the second digital 3D model to define portions of geometry of the second 3D model and (ii) camera poses of the input photographs in the coordinate system of the second 3D model; and
   generating, by the one or more processors, alignment data for aligning the first 3D model with the second 3D model using the camera poses of the virtual camera and the camera poses corresponding to the input photographs.

2. The method of claim 1, wherein generating the points in the coordinate system of the second digital 3D model includes applying a 3D geometry reconstruction technique whereby projections of points in a physical world of the scene onto the input photographs are used to generate the points as reconstructed points, wherein each of the reconstructed points corresponds to a respective one of the points in the physical world of the scene.

3. The method of claim 2, including generating one of the reconstructed points using projections of the corresponding point in the physical world of the scene onto one of the synthetic photographs and onto one of the real-world photographs.

4. The method of claim 3, wherein the projection onto the synthetic photograph is within a texture.

5. The method of claim 3, wherein generating the alignment data includes using (i) the camera pose of the virtual camera used to generate the synthetic photograph and (ii) the camera pose of the synthetic photograph in the coordinate system of the second 3D model.

6. The method of claim 1, wherein the first 3D model is developed manually using geometric shapes to define model geometry and textures.

7. The method of claim 6, wherein generating the synthetic photographs includes:
   receiving 3D model data that specifies the model geometry and the textures, and
   rendering the 3D model data to generate the first 3D model according to the different camera poses of the virtual camera, wherein each camera poses includes a position and orientation.

8. The method of claim 1, wherein generating the synthetic photographs includes orbiting the virtual camera around the scene approximately at an eye level.

9. The method of claim 1, further comprising, subsequently to aligning the first 3D model with the second 3D model, at least one of:
applying at least some of the real-world photographs of the scene to the first model,
generating a depthmap of the real-world photographs of the scene using the first 3D model,
refining geometry of the first 3D model using the second 3D model, or
closing gaps in geometry within the second 3D model using the first 3D model.

10. The method of claim 1, wherein:
the camera poses of the virtual camera specify positions and orientations in a coordinate system of the first 3D model,
the camera poses corresponding to the input photographs specify positions and orientations in the coordinate system of the second 3D model, and
generating the alignment data includes a transform function for translating geometry between the coordinate system of the first 3D model and the coordinate system of the second 3D model.

11. A non-transitory computer-readable storage medium storing thereon instructions that, when executed on one or more processors, cause the one or more processors to:
receive a plurality of real-world photographs of a scene;
receive digital model data that specifies geometry of a first digital 3D model of the scene in a first coordinate system;
using the received digital model data, generate a plurality of synthetic photographs of the first digital 3D model, wherein each of the plurality of synthetic photographs is a static image generated according to a different position and orientation of a first virtual camera in the first coordinate system;
apply 3D geometry reconstruction to the plurality of real-world photographs and the plurality of synthetic photographs to determine (i) 3D geometry of a second 3D model of the scene defined in a second coordinate system, and (ii) positions and orientations of a second virtual camera in the second coordinate system for the plurality of real-world photographs and the plurality of synthetic photographs; and
automatically align the first digital 3D model with the second digital 3D model using the plurality of synthetic photographs.

12. The computer-readable medium of claim 11, wherein to automatically align the first digital 3D model with the second digital 3D model, the instructions cause the one or more processors to generate alignment data based on the positions and orientations of the first virtual camera in the first coordinate system and the positions and orientations of the second virtual camera in the second coordinate system for the plurality of synthetic photographs.

13. The computer-readable medium of claim 11, wherein the received digital model data further specifies photographic textures for application to the geometry of the first digital 3D model.

14. The computer-readable medium of claim 11, wherein the first digital 3D model is manually developed digital 3D model.

15. The computer-readable medium of claim 11, wherein to generate the plurality of synthetic photographs, the instructions cause the one or more processors to orbit the first virtual camera around the scene approximately at an eye level.

16. The computer-readable medium of claim 11, wherein after the first digital 3D model has been aligned with the second digital 3D model, the instructions further cause the one or more processors to one or more of:
apply at least some of the real-world photographs of the scene to the first model,
generate a depthmap of the real-world photographs of the scene using the first 3D model,
refine geometry of the first 3D model using the second 3D model, or
close gaps in geometry within the second 3D model using the first 3D model.

17. The computer-readable medium of claim 11, wherein the plurality of real-world photographs of the scene are received from a multiplicity of different users.

18. A computer-implemented method for combining features of digital 3D models, the method comprising:
receiving, by one or more processors, a first digital 3D model of a scene;
receiving, by the one or more processors, a second digital 3D model of the scene;
automatically aligning, by the one or more processors, the first digital 3D model with the second digital 3D model, including applying 3D geometry reconstruction to first images associated with the first digital 3D model and second images associated with the second digital 3D model, the first images being synthetic photographs generated according to a different camera poses of a virtual camera and the second images being real-world photographs of the scene, wherein aligning the first digital 3D model with the second digital 3D model includes determining camera poses of the synthetic photographs relative to the second digital 3D model;
applying, by the one or more processors, features of one of the first digital 3D model and the second digital 3D model to the other one of the first digital 3D model and the second digital 3D model; and
generating, by the one or more processors, alignment data using the camera poses of the synthetic photographs relative to the first digital 3D model and the camera poses of the synthetic photographs relative to the second digital 3D model.

19. The method of claim 18, wherein:
the first digital 3D model is developed manually using component geometric shapes, and
the second digital 3D model is generated automatically using 3D geometry reconstruction.

20. The method of claim 18, wherein applying features of one of the first digital 3D model and the second digital 3D model to the other one of the first digital 3D model and the second digital 3D model includes one or more of:
applying at least some of the first images to the second digital 3D model, and
refining geometry of the first digital 3D model using the second digital 3D model.

* * * * *